July 27, 1937.   J. D. RAMSEY   2,088,116
FILTER
Filed Feb. 21, 1936
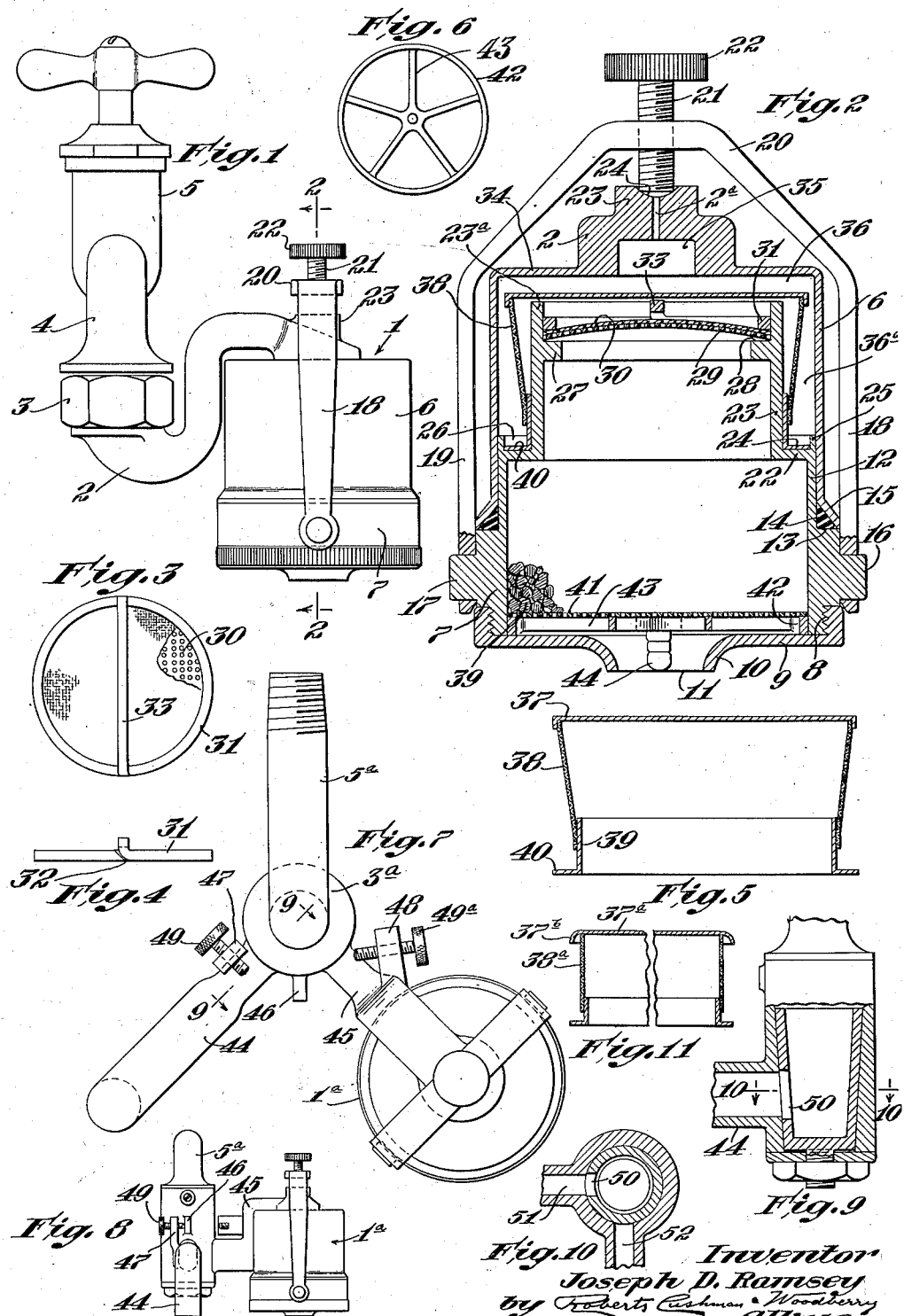
Inventor
Joseph D. Ramsey
by Roberts Cushman Woodberry
attys.

Patented July 27, 1937

2,088,116

UNITED STATES PATENT OFFICE 2,088,116

FILTER

Joseph D. Ramsey, Boston, Mass.

Application February 21, 1936, Serial No. 65,014

9 Claims. (Cl. 210—87)

This invention pertains to filters and relates more particularly to filter devices designed for association with or to take the place of a faucet, cock or tap providing a controlled outlet for a domestic or other water supply, the present invention constituting an improvement upon that disclosed in my Patent No. 1,294,164, dated February 11, 1919.

Since water supplies for domestic use are frequently contaminated with suspended solid matter, either of organic or mineral nature, as well as dissolved gases which sometimes impart an undesirable or unpleasant color, odor or taste, and since such water supplies often contain bacteria or other organisms of microscopic size, it is common to provide filter means in immediate association with the faucet or other controlling outlet with the object of removing such impurities from the water so far as is possible by filtration methods.

In order to be effective for the intended purpose, any such filter device must be of a character such as to permit ready cleaning, reconditioning or renewal of the filter medium at frequent intervals. For this reason, from a practical standpoint, the filter device should be so devised that the filtering medium may be removed or renewed without recourse to the use of tools or the services of a skilled workman. Furthermore, if the apparatus is to be really effective for the intended purpose, it must be so designed as to prevent any leaking or by-passing whatever of the water around the filter element or media, since even a slight leakage may permit the passage of microscopic organisms, for example, harmful bacteria, with the water which is delivered from the device.

In my prior Patent No. 1,294,164, dated February 11, 1919, I disclosed a water filter in many respects superior to any prior devices known to me,—the device disclosed in said patent comprising a casing having separable parts united by a screw-threaded connection, said casing enclosing suitable filtering media and having therein a pocket or recess for the collection of sediment, but in practice it has been found that the user of the patented device sometimes has difficulty in properly reengaging the screw threads after separation of the parts for renewal of the filtering material. Furthermore, in said prior patented device, the parts are so designed and associated that there is at least a possibility of slight leakage of unfiltered water through the device.

One of the objects of the present invention is to provide an improvement over the structure disclosed in the aforesaid patent, and in particular to provide simple and efficient connections for uniting the parts of the casing, the connections being such as may be manipulated easily and quickly by the most unskilled and capable of forming a leakproof joint between the parts of the casing. A further object is to provide a filter so devised that leakage or by-passing of the water around the filtering element or elements is impossible.

A further object is to provide a filter of simplified construction including a filtering element so arranged as to facilitate the automatic separation of filtered-out solids from one at least of the filtering surfaces and their collection at a point outside of the direct path of fluid flow. Further objects are to provide improved means for removably retaining certain of the filtering elements in operative position; to provide a filter device which may be used instead of the ordinary faucet, if desired;—to provide a filter device so devised as to permit the alternate delivery of filtered or unfiltered fluid at will; and to embody the several features of improvement in a simple, compact, and practical construction and in apparatus of pleasing external appearance.

These and other objects and advantages of the invention will be made manifest in the following more detailed description and by reference to the accompanying drawing, in which Fig. 1 is a front elevation illustrating one embodiment of the improved filter as applied to a faucet of ordinary construction;

Fig. 2 is a vertical section, to larger scale, substantially on the plane of the line 2—2 of Fig. 1;

Fig. 3 is a plan view of the upper edge of the lower section of the filter casing, with certain parts broken away, illustrating the means for holding one of the filtering elements in operative position;

Fig. 4 is an edge elevation of a snap ring shown in Fig. 3;

Fig. 5 is a side elevation illustrating a filtering element or screen which is normally housed within the casing;

Fig. 6 is a plan view of a spider employed for supporting one of the filtering elements;

Fig. 7 is a plan view of a modified construction, showing the improved filtering device arranged to take the place of an ordinary faucet;

Fig. 8 is a front elevation, to small scale, of the device of Fig. 7;

Fig. 9 is a vertical section substantially on the line 9—9 of Fig. 7, but showing the delivery spout in operative position;

Fig. 10 is a fragmentary horizontal section on line 10—10 of Fig. 9; and

Fig. 11 is a view similar to Fig. 5, but to smaller scale, illustrating a modified construction.

Referring to the drawing, the numeral 1 designates the improved filtering device as a whole. This device is provided with a tubular gooseneck support 2 secured by a swivel coupling 3 to the delivery spout 4 of a faucet 5. By the employment of the swivel coupling at 3 the filter device may be swung to any convenient position for delivery of the water.

The filter device proper has a substantially cylindrical casing comprising the upper member 6 and the lower member 7, the upper member being supported by the goose-neck 2, preferably being integrally joined to the latter. The lower end of the lower member 8 of the casing is externally screw threaded and receives the bottom closure or cap 9 whose outer edge may be knurled, if desired, to facilitate its attachment to or removal from the part 7. Ordinarily the bottom closure member may be left in position indefinitely since the filtering material, except for the lowermost screen member hereafter described, may be removed through the upper end of the casing member 7 without disturbance of the bottom member or cap 9.

The bottom member 9 is provided at its center with a curved, downturned annular lip 10 defining a delivery orifice 11 through which the purified water is delivered from the filter.

The lower member 7 of the casing comprises a cylindrical portion 12 of somewhat lesser diameter than the lower part of the member 7, thus providing a substantially horizontal shelf or ledge 13 upon which resilient packing material, for example a rubber ring 14, may be seated. The lower margin of the upper member 6 of the casing is preferably flared out, as shown at 15, so as easily to fit over the rubber ring 14 and thus to provide a leakproof connection between the lower and upper members of the casing.

The lower member 7 of the casing is provided with oppositely directed, preferably integral, pintle members 16 and 17 which enter openings in the lower ends of the legs 18 and 19, respectively, of a bail or yoke device 20 which, in the normal operative condition of the parts, stands in a substantially vertical plane and embraces the upper part 6 of the casing. The top portion of the yoke or bail 20 is furnished with a screw-threaded opening for the reception of the clamping screw 21 having a knurled head 22 by means of which it may be manipulated. The goose-neck 2 is provided with a boss 23 adjacent to its junction with part 6, said boss having a cavity 24 coaxial with the casing and which is designed to receive the lower end of the clamping screw 21. A passage 2ª leads from the cavity 24 inwardly through the thickness of the boss 23 but is normally closed by the end of the screw 21, said end being ground to have a leak-tight fit in the cavity 24. When the bail or yoke is positioned as shown in Figs. 1 and 2, the clamping screw 21 may be turned by means of the fingers so as to exert substantial force between the yoke member and the top member of the casing, thus drawing the bottom member of the casing tightly against the top member so as to form a leakproof joint at the point where the packing 14 is interposed between upper and lower casing parts.

Above the shelf or ledge 13, the lower member 7 of the casing is provided with an inwardly directed flange 22 from whose inner edge the casing extends upwardly in a cylindrical top portion 23 of smaller diameter. The upper surface 24 of the ledge 22 forms an annular shelf to support a filter or screen device hereinafter described, and the part 12 of the lower member of the casing is extended up above this shelf to form a wall 25, thereby defining an annular pocket or recess 26 for the collection of filtered-out material.

The top portion 23 of the lower member of the casing is provided at a point below its extreme upper edge with an inwardly directed annular flange 27 whose upper surface 28 forms a support for a circular screen 29, preferably upwardly convex, which in turn forms a support for a filter pad 30 which may be of felt, cloth, asbestos, or the like, and which is designed to filter out solid material. These filter elements 29 and 30 are held in position within the casing by means of a snap ring 31, for example, of the kind disclosed in my aforesaid patent, and which may be of any suitable somewhat resilient material, for example metal, split at 32 (Fig. 4) to permit it to be snapped into position and then to bear resiliently against the walls of the upper part 23 of the lower casing member. For convenience this snap ring is provided with a transverse member or handle 33 by means of which it may be manipulated.

The substantially cylindrical top member 6 of the casing has a top closure member 34, preferably integral with its side walls, said closure member having an inlet opening which communicates with a passage 35 extending through the tubular gooseneck 2. The space 36 immediately below the top closure member 34 constitutes an inlet chamber. In this chamber, and spaced from but directly below the inlet opening, is an imperforate diffuser plate 37 constituting the top of a removable screen device (Fig. 5). This screen device comprises the annular perforate or foraminous screen member 38, permanently secured at its upper edge to the top plate 37 and at its lower edge to an annulus 39 having an outstanding or radial flange 40 normally resting upon the surface 24 of the ledge 22. This member 40 constitutes the bottom of the annular pocket 26. The annular screen 38 is preferably of larger diameter at its top than at its bottom (Figs. 2 and 5) so that it slopes downwardly and inwardly. The flowing fluid is outwardly deflected by the top member 37 as it moves downwardly into the annular space 36ª between the concentric walls 23 and 6, from which it then flows inwardly radially through the screen 38 into the space between the screen and the outer surface of the upper part 23 of the lower member of the casing. As the horizontal area of the annular space 36ª is much greater than that of the inlet passage 35, the velocity of the water is much reduced before it passes the screen 38, which facilitates the filtering action and the settling of solid materials into the pocket 26.

Since the lower member of the casing, comprising the parts 12, 22 and 23, is integral, uninterrupted and continuous, the fluid which enters the annular chamber 36ª is constrained to move inwardly through the screen 38 without any possibility of leakage or by-passing from the chamber 36ª to the outlet opening 11. After passing through the screen 38, the liquid must all move upwardly over the upper edge 23ª of the part 23 and then downwardly through the filter pad 30 and screen 29 into the large chamber defined by the parts 12 and 23. This chamber is filled or partially filled with suitable filtering material 39, for example sand, aluminum sulfate, charcoal, etc., operative mechanically, by adsorption, or chemically, to obstruct, entangle, precipitate, or destroy impurities in the water. The water then flows down through a screen 41 which forms a support for the filtering material and which rests upon a spacer device or spider 42 which in turn rests upon the bottom 9 of the lower member of the casing and which preferably has radial arms 43 merging at the center of the support or spider and from which may depend a boss 44 disposed axially of the outlet opening 11 and which serves to prevent cavitation at the center of the flowing stream and thus to ensure smooth delivery.

When the device is attached to an ordinary faucet as illustrated in Fig. 1, the arm 2 may be swung to any desired position convenient to the user, and when the faucet is opened, the water flows through the goose-neck arm 2 and enters the inlet chamber 36 of the casing, thence passing down into the annular chamber 36a and through the screen 38, then over the edge 23a and down through the filter pad 30 and screen 29, thence through the filtering material 39 and through the screen 41 and out through the opening 11.

When the filter pad 30 or the filtering material 39 have been used for a period sufficiently long so that they need replacement, it is merely requisite to loosen the clamping screw 22 by means of the fingers, without removing it from the yoke 20, whereupon the yoke may be swung down and the lower member of the casing freely dropped away from the upper member. The screen 38 is then lifted out, thus exposing the pad 30 to view. The snap ring 33 may then be lifted by means of its handle 33 and the pad 30 and the screen 29 removed. The filtering material 39 may then be dumped out of the lower casing member and replaced with fresh material. The screen 29 is then replaced, a new pad 30 put in position, and the snap ring restored to position. Thereupon the lower member of the casing is pushed up into the upper member, the yoke 20 is swung back into position, and the clamp screw 22 tightened, thereby returning the parts to normal operative position. This entire operation may be performed by the most unskilled without difficulty and without necessitating the employment of special tools, and with reasonable certainty of restoring the parts to proper leakproof relationship.

When the clamping screw 22 is retracted preparatory to the separation of the casing members, it uncovers the upper end of the passage 2a, thus permitting air freely to enter the inlet chamber 36. Thus even though the filter material may prevent rapid entrance of air through the orifice 11, the air which enters through the passage 2a neutralizes the effect of atmospheric pressure so that the casing parts may readily be separated. The resultant free and smooth action in separating the parts avoids any sudden jerking of the filter elements within the casing and thus prevents any tendency to stir up the sediment which may have collected in the filtering material or in the pocket at 26. Thus when the screen device 38 is lifted, together with the flange 40, it carries with it substantially all of the sediment which has collected in the pocket 26.

It may be noted that by reason of the outward inclination of the screen 38, any solid particles of material which encounter the screen tend, as soon as flow ceases or decreases in velocity, to drop freely by gravity into the pocket 26. As above noted, there is no crevice, joint, or passage through which unfiltered water may move from the entrance chamber 36 to the outlet 11 and thus there is no danger of contamination of the water emerging from the delivery opening 10 through leakage of unfiltered water from a contaminated supply.

In Fig. 11 a slight modification of the screen device of Fig. 5 is illustrated wherein the screen 38a is substantially cylindrical while the deflector member 37a is of substantially larger diameter than the cylindrical screen member so that its marginal portion 37b projects outwardly beyond the top portion of the screen. This projecting marginal portion directs the fluid outwardly to such an extent as to set up eddies in the chamber 36a which tend to sweep clean the surface of the cylindrical screen and to cause the sediment to drop down into the pocket 26.

In Figs. 7 and 8, a modification is illustrated wherein, instead of attaching the filter device to a faucet, it forms the faucet itself. In this case the conduit 5a, which is attached to the source of supply, and which takes the place of the faucet, is provided with a swivel support or connection 3a designed to be turned relatively to the conduit but having suitable leak-tight packing permitting such turn without leakage. The swivel support 3a is provided with a pair of angularly disposed arms 44 and 45, respectively, here shown as substantially 90° apart. These arms are hollow, each having a passage which may alternatively be brought into communication with the passage in the part 5a. For this purpose that portion of the conduit which enters the swivel connection 3a may be provided with a port 50 designed to communicate with a port 51 or 52 respectively at the inner ends of the passages in the respective arms 44 and 45, according as the port in one arm or the other is brought into registry with such port 50.

One of these arms, for example the arm 44, is designed to form a delivery spout, and when its port 51 is in registry with the port 50, this arm provides free passage of fluid without subjecting it to the filtering process. This is desirable when, for example, a rapid flow of water is required without necessitating its filtration, for example, for washing purposes. The other arm 45 may be similar to the goose-neck 2 of the device previously described, and supports the casing of a filtering device 1a similar to the device 1 above referred to.

The arms 44 and 45 preferably are provided with lugs 47 and 48, respectively, having threaded openings for the reception of adjustable stop screws 49 and 49a which are adapted alternatively to contact a fixed stop member 46 carried by the member 5a. These stop devices 49 and 49a are so adjusted that whenever one or the other engages the fixed stop 46, the port in one of the arms is in registry with the port 50 at the end of the conduit 5a so that fluid may flow either through the delivery spout 44 or through the filtering device 1a, but when the arms 44 and 45 are disposed in the position indicated, for example in Fig. 7, the flow is cut off through either arm. By properly adjusting the screws 49 and 49a, the degree to which the port 51 may be opened to either of the ports 51 or 52 may be predetermined, thus to regulate the velocity of flow, either through the spout 44 or the filtering device. The device may thus take the place of the ordinary faucet, but it is to be understood that, if desired, it may be attached to an ordinary faucet and the latter may be used as the primary controller of fluid flow, while the angular position of the member 3ª is depended upon to determine whether the water shall flow through the spout 44 or whether it shall be filtered before delivery by passage through the filter device 1ª.

While certain desirable embodiments of the invention have herein been disclosed by way of example, it is to be understood that the invention is not necessarily limited to the details of construction here described or illustrated, but that all equivalents falling within the terms of the appended claims are to be regarded as within the scope of the invention.

I claim:

1. A filter device of the class described having a casing comprising a hollow substantially cylindrical upper member and a lower member, the latter having a cylindrical portion telescoping snugly within the upper member and terminating at a peripheral ledge, one of said members having an air inlet passage leading to the interior of the casing, packing material resting upon the ledge, and movable clamping means normally operative to draw the lower marginal portion of the upper member of the casing into leakproof contact with said packing material, said clamping means comprising a closure for the air inlet passage which closes said passage when the clamping means is in operative position but which leaves said passage open when the clamping means is released.

2. Filter apparatus of the class described comprising a casing including snugly interfitting separable members, one of said members having an air inlet passage leading to the interior of the casing, a fluid inlet conduit connected to one of said members, the other member having a fluid outlet, filter means within the casing, and means normally uniting the members of the casing, said uniting means comprising a bail normally secured to one of said members and adapted to embrace the other member, and movable pressure-applying means reacting between the bail and the latter casing member for drawing the casing members together, said pressure-applying means comprising a closure for the air inlet passage arranged to close said passage when in pressure-applying position but to leave the passage open when removed from pressure-applying position.

3. Filter apparatus of the class described comprising a casing including telescopic separable members, a fluid inlet conduit connected to one of said members, the other member having a fluid outlet, filter means within the casing, means normally uniting the members of the casing, said uniting means comprising a bail normally engaging one of said members and adapted to embrace the other member, said latter member having an air inlet leading to the interior of the casing, and a manually actuable pressure-applying device carried by the bail and normally engaging the last-named casing member and holding said casing members into leakproof contact, said pressure-applying device sealing said air inlet passage when thus holding the casing members in contact.

4. A filter device of the class described having a casing comprising an upper member and a lower member, the upper member having a substantially cylindrical shell closed at the top except for a fluid inlet opening and an air passage of small diameter, said shell having an outwardly flared lower margin, the lower member of the casing having a cylindrical portion fitting snugly in contact with the lower part of the upper member and a peripheral ledge forming a stop for the lower margin of the upper member, packing interposed between the ledge and the outwardly flaring margin of the upper member, and quickly releasable clamping means operative to draw the casing members toward one another, said clamping means comprising a part which closes said air passage when the clamping means is in operative position to draw the casing members together.

5. A filter device of the class described having a casing comprising an upper member and a lower member, the upper member having a substantially cylindrical shell, normally closed at the top except for a water inlet opening, the lower member of the casing comprising a portion of large diameter telescoping snugly within the lower part of the upper member and a peripheral exterior ledge forming a stop for the lower edge of the upper member, the lower member of the casing having an inwardly directed ledge from whose inner edge said lower member extends upwardly in a cylindrical top portion of smaller diameter, the inwardly directed ledge having an integral annular wall at its outer edge thereby defining an annular pocket for the collection of filtered-out matter, and a removable annular strainer having its lower edge resting upon said inwardly directed ledge within the pocket and disposed in the annular chamber defined by the upper casing member and said cylindrical top portion of the lower casing member, said screen having an imperforate top, the lower member of the casing with its portions of large and small diameter being of integral construction whereby fluid from said annular chamber is unable to pass into the lower portion of the casing except through said screen.

6. A filtering device comprising a casing having an upper substantially cylindrical member normally closed at its top except for inlet opening for the entrance of liquid, a lower member closed at its bottom except for an outlet, said lower member being of integral one-piece construction comprising an upper portion of relatively small diameter and a lower portion of relatively large diameter, the upper member telescoping snugly over the lower part of the lower member, a clamping device normally pivotally secured to the portion of larger diameter, the lower member having a screen-supporting ledge provided with an integral, upwardly extending wall forming a sludge-receiving pocket, and an annular downwardly tapering screen surrounding and spaced from said part of lesser diameter and seated on said ledge, said latter part having therein a filter pad through which the fluid is constrained to flow.

7. A filter device of the class described comprising a casing having an inlet and an outlet, a screen device comprising a cylindrical foraminous member and an imperforate top member, the latter having a downwardly and outwardly flaring marginal portion which overhangs and projects outwardly from and downwardly below the upper end of the foraminous member thereby to deflect the fluid outwardly and away from the upper part of said foraminous member, and means providing an annular pocket concentric with the foraminous member and adjacent to the lower edge of the latter to receive sediment which drops from the cylindrical member.

8. In combination in a filter device of the class described, a casing comprising substantially cylindrical, separable upper and lower members, releasable clamping means normally holding said members in assembled relation, the lower member of the casing having an inwardly directed ledge from whose inner edge said lower member extends upwardly in a cylindrical top portion of smaller diameter, said lower member of the casing being of integral one-piece construction and having means defining an external upwardly open annular pocket at the junction of its portions of larger and smaller diameter, said pocket being designed for the reception of filtered-out material, and an annular downwardly tapering screen disposed within said annular pocket, said screen having an imperforate top spaced from the top edge of the lower member, a transverse septum of filtering material disposed within the top portion of the lower casing member, and a mass of filtering material disposed within the larger portion of the lower casing member, the upper casing member having an air inlet opening leading into the space above the top of the screen and the clamping means comprising a part which closes said inlet opening when the clamping means is in position for holding the upper and lower members of the casing in assembled position.

9. A filter device of the class described comprising a swivel support designed for attachment to a fluid delivery conduit, a pair of arms carried by the swivel support, each arm having a passage, said passages being designed for alternate communication with the conduit in accordance with the position of the swivel support, one arm being shaped to constitute a delivery spout and the other supporting a hollow casing, said casing comprising upper and lower separable hollow members defining spaces for filtering media, filtering media within said spaces, and a chamber with which the passage in the arm which supports the casing communicates, clamping means normally uniting the upper and lower members of the casing, and independent adjustable stop elements operative to limit swing of the swivel support in either direction from a position in which fluid flow is completely shut off, thereby definitely to determine the size of the passage which at any given time communicates with the conduit.

JOSEPH D. RAMSEY.